United States Patent
Rocke

(10) Patent No.: US 8,111,502 B2
(45) Date of Patent: Feb. 7, 2012

(54) ARRANGEMENT ADAPTED FOR A SUBSEA APPLICATION

(75) Inventor: Svend Rocke, Lier (NO)

(73) Assignee: Vetco Gray Scandinavia AS, Sandvika (NO)

(*) Notice: Subject to any disclaimer, the term of this patent is extended or adjusted under 35 U.S.C. 154(b) by 0 days.

(21) Appl. No.: 12/166,587

(22) Filed: Jul. 2, 2008

(65) Prior Publication Data

US 2009/0009931 A1 Jan. 8, 2009

(30) Foreign Application Priority Data

Jul. 3, 2007 (NO) .................................. 20073434

(51) Int. Cl.
- H02P 9/00 (2006.01)
- H02P 11/00 (2006.01)
- H02P 9/14 (2006.01)
- H02B 1/00 (2006.01)
- H02B 5/00 (2006.01)
- E21B 7/12 (2006.01)
- G06F 1/00 (2006.01)
- G06F 1/32 (2006.01)

(52) U.S. Cl. .............. 361/602; 322/28; 322/29; 322/34; 322/39; 322/46; 361/601; 361/603; 361/605; 166/356; 166/366; 713/300; 713/310; 713/321; 713/324

(58) Field of Classification Search .......... 361/601–602; 174/50, 52; 322/28–46; 166/356; 713/300, 713/310, 321

See application file for complete search history.

(56) References Cited

U.S. PATENT DOCUMENTS

| 5,754,031 A * | 5/1998 | Kanazawa et al. | 322/28 |
| 5,932,933 A * | 8/1999 | Asanuma | 307/18 |
| 7,162,521 B2 * | 1/2007 | Ewing et al. | 709/223 |
| 2004/0137773 A1 | 7/2004 | Ostergaard | |
| 2004/0149446 A1 * | 8/2004 | Appleford et al. | 166/366 |

FOREIGN PATENT DOCUMENTS

| WO | WO-02/072999 A1 | 9/2002 |
| WO | WO-2007/071266 A1 | 6/2007 |

OTHER PUBLICATIONS

Norwegian Search Report—Jan. 23, 2008.

* cited by examiner

*Primary Examiner* — Jayprakash N Gandhi
*Assistant Examiner* — Jerry Wu
(74) *Attorney, Agent, or Firm* — Venable LLP; Eric J. Franklin

(57) ABSTRACT

An arrangement related to subsea electric power distributing AC-system and adapted for a subsea application. The arrangement is enclosed in a watertight casing. The casing exposes a main power input connection, adapted for watertight co-ordination with a first subsea cable and a main power output connection, adapted for a watertight co-ordination with a second subsea cable. The second subsea cable is adapted for a power supply to an AC-current and AC-voltage adapted device. The arrangement includes interconnected: a voltage regulator connected to the first cable, and a NO-load switching unit connected to the second cable, and a control unit. The control unit is adapted, in a first operative mode, to regulate the output AC-voltage from the voltage regulator towards and to zero, or at least almost to zero, and in a second subsequent operative mode, to bring the NO-load switching unit from an ON-position to an OFF-position or vice versa.

16 Claims, 2 Drawing Sheets

1

ARRANGEMENT ADAPTED FOR A SUBSEA APPLICATION

CROSS-REFERENCE TO RELATED APPLICATIONS

This application claims priority to Norwegian patent application 20073434 filed 3 Jul. 2007.

TECHNICAL FIELD OF THE INVENTION

The present invention has its general application to an arrangement and especially to an arrangement related to a subsea electric power distributing AC-system, and as such adapted for a subsea application.

More precisely said arrangement is being enclosed in a watertight casing, adapted to withstand high underwater pressure at deep sea applications, such as up to 2000 m and above.

Said casing is exposing a main power input connection, adapted for a watertight co-ordination with a first subsea main cable and a main power output connection, adapted for a watertight co-ordination with a second subsea main cable.

Said second subsea cable being adapted for causing a power supply to an AC-adapted consumer, in the form of a device or an equipment, such as a pump or similar electrically powered equipment.

The present invention has its application in subsea plants for bringing or boosting hydrocarbons from the bottom of a sea area to a topside platform or to land, for a subsequent treatment.

BACKGROUND OF THE INVENTION

Methods, systems and/or arrangements, falling within the above technical field and the above mentioned natures, are previously known in a plurality of different forms and/or embodiments.

By way of introduction, it may be mentioned that it is previously known different arrangement adapted to relate to and to form a part of a subsea electric power distributing AC-system, and adapted for a deep subsea application, said arrangement thus being enclosed in a watertight, and normally with an oil filled, casing.

Said casing is exposing a main power input connection, adapted for a watertight co-ordination with usually a very long first subsea cable, supplying the required AC-voltage and AC-current.

The length of such first subsea cables may be, for some applications, in the range of up to 200 km and above and the power supply may be up to 200 MVA and above, which means that special criteria and application must be considered when connecting and/or disconnecting such a high load consumer, such as a device or an equipment, usually in the form of an electric AC-three phase motor or the like.

It is here to be mentioned that an AC-voltage drop, caused by the area of the used conductors and the actual length of the 3-phase power feeding cable at a specific load, is high and that the AC-voltage, during a NO-load condition, is to be chosen much higher than the normally required AC-voltage, adapted to the actual consumer.

This means that a used 3-phase AC-motor normally is to be dimensioned for a high and predetermined start up AC-voltage and an expected high start up AC-current, by and when applying a direct starting mode.

For this application it is to be used means for an "ON-load switching means".

It is further to realize that in such an application it is essential to choose a large conductive area for the used subsea cable, for compensating for any mentioned AC-voltage drop, at least during the initial starting up mode.

A main power output connection, related to said casing, is adapted for a similar watertight co-ordination with a second subsea cable, said second subsea cable being adapted for a power supply to an AC-current and AC-voltage adapted consumer, such as a device or an equipment, as illustrated above.

Within such an arrangement it is normally enclosed an AC-voltage transformer means, adapted to a fixed AC-voltage transforming ratio, to compensate for any AC-voltage drop, caused by a cable related resistance, inductance and/or capacitance.

As the electrical criteria, related to the consumer's device or equipment in the form of an AC-load, is calculated and known as to its starting mode and its effect as well as the length of and other criteria related to the mentioned first subsea cable supplying the required AC-voltage, the construction of the used arrangement, based upon the length of and the other criteria related to the mentioned second subsea cable, connected to the consumer's device or equipment, as the AC-load, the AC-voltage transformer means may be set to a calculated value or ratio.

Within said casing and related to said arrangement may also be enclosed an AC-load circuit disconnecting (breaking) or connecting means, adapted for a direct disconnecting or breaking of an AC-loaded connection or adapted for a direct connecting of an AC-loaded connection, however such breaking or connecting means are complicated in construction, in order to withstand any caused arc development, when breaking and connecting large effects, especially capacitance or reactance related or exposing circuits.

It is however in this application also previously known to use a so called NO-load disconnecting or breaking and connecting means, which is adapted to activate a breaking mode or a connecting mode at a regulated AC-voltage at 0-level and thereafter, by frequency control means connect the load to an increasing AC-voltage.

The present invention has its use in a NO-load disconnecting or breaking mode and a connecting mode and used within a subsea application.

SUMMARY OF THE PRESENT INVENTION

Technical Problems

If attention is paid to the circumstances that the technical considerations a person skilled in the relevant technical field has to make, in order to be able to present a solution to one or more technical problems raised, initially there is to be a necessary insight in the measures and/or the sequence of measures that should be taken as well as a necessary choice of the means that is or are required, the subsequent technical problems should, in view of this, be considered as relevant in creating and forming the present subject of invention.

When taking the prior art constructions, related to a subsea application, into consideration, as it is described above, it should therefore be seen as a technical problem to be able to realize the significance of, the advantages associated with and/or technical steps to be taken, in an arrangement, related to a subsea adapted electric power distributing AC-system, and adapted for a deep subsea application, said arrangement being enclosed in a watertight casing, whereby said casing is exposing a main power input connection, adapted for a watertight co-ordination with a first sub-sea cable, and a main power output connection, adapted for a watertight co-ordination with a second subsea cable, said second subsea cable being adapted for a power supply to an AC-current and AC-voltage adapted consumer, as a device or equipment, such as a pump equipment, and to offer a disconnecting or breaking mode or a connecting mode facility under NO-load condition and thereby causing a starting mode or a stopping mode of the consumers device or equipment by a frequency control, where circuit arrangements for such AC-voltage and/or frequency control are totally enclosed within said watertight casing.

When taking the prior art into consideration, as it is described above, it should therefore be seen as a technical problem to be able to realize the significance of, the advantages associated with and/or the technical steps to be taken, in an arrangement, where said arrangement includes interconnected at least: a voltage regulating means, connected to said first cable, a NO-load switching unit, connected to said second cable and a control unit, totally enclosed in said casing.

When taking the prior art into consideration, as it is described above, it should therefore be seen as a technical problem to be able to realize the significance of, the advantages associated with and/or the technical steps to be taken, in an arrangement where said control unit is adapted to cause a disconnecting or breaking sequence, in a first operative mode, to regulate the output AC-voltage via said voltage regulating means towards and to zero, or at least almost to zero, and in a subsequent second operative mode bringing the NO-load switching unit from an ON-position to an OFF-position.

When taking the prior art into consideration, as it is described above, it should therefore be seen as a technical problem to be able to realize the significance of, the advantages associated with and/or the technical steps to be taken, in an arrangement where said control unit, at a zero AC-voltage condition, is adapted to cause a connecting sequence, in a third operative mode, to bring the NO-load switching unit from an OFF-position to an ON-position and in a subsequent fourth operative mode regulate the output voltage from said voltage regulating means from zero to a predetermined AC-voltage level.

When taking the prior art into consideration, as it is described above, it should therefore be seen as a technical problem to be able to realize the significance of, the advantages associated with and/or the technical steps to be taken, in an arrangement where said voltage regulating means is to be controlled by said control unit within said casing and where said control unit is adapted to be controlled and/or governed by a main control system, where said main control system is related to a subsea or a land based central control plant or equipment.

When taking the prior art into consideration, as it is described above, it should therefore be seen as a technical problem to be able to realize the significance of, the advantages associated with and/or the technical steps to be taken, in an arrangement where said control unit is to be connectable to said main control system by a subsea cable, using a watertight connection, adapted for a third subsea cable.

When taking the prior art into consideration, as it is described above, it should therefore be seen as a technical problem to be able to realize the significance of, the advantages associated with and/or the technical steps to be taken, in an arrangement where a subsea adapted network, exposing a number of parallel structured distributed branches, each of or a selected number of said branches is/are allotted an AC-voltage regulating means and a NO-load switching unit, for individually bringing each of said or predetermined branches to an OFF-mode and/or to an ON-mode or vice versa.

When taking the prior art into consideration, as it is described above, it should therefore be seen as a technical problem to be able to realize the significance of, the advantages associated with and/or the technical steps to be taken, in an arrangement where said AC-voltage regulating means is adapted to regulate and to reduce the output voltage or power towards zero by a magnetic flux adoption.

When taking the prior art into consideration, as it is described above, it should therefore be seen as a technical problem to be able to realize the significance of, the advantages associated with and/or the technical steps to be taken, in an arrangement where said AC-voltage regulating means is based upon a semi conductive technology, and/or system, a system exposing one or more positive temperature coefficient resistors, a system including mechanically or electrical controlled inductors, and/or the use of two or more combinations of these systems.

When taking the prior art into consideration, as it is described above, it should therefore be seen as a technical problem to be able to realize the significance of, the advantages associated with and/or the technical steps to be taken, in an arrangement where said NO-load switching unit is based upon a mechanical connection and/or disconnection, being operable within a watertight casing adapted for a subsea environment and enclosed in an oil filled casing.

When taking the prior art into consideration, as it is described above, it should therefore be seen as a technical problem to be able to realize the significance of, the advantages associated with and/or the technical steps to be taken, in an arrangement where a NO-load switching unit is based on a subsea wet mate power connector, hydraulically or electrically operable elements, which are adapted to operate with sliding elements.

When taking the prior art into consideration, as it is described above, it should therefore be seen as a technical problem to be able to realize the significance of, the advantages associated with and/or the technical steps to be taken, in an arrangement where said NO-load switching unit is based upon an arrangement, causing a physically separate contact means.

When taking the prior art into consideration, as it is described above, it should therefore be seen as a technical problem to be able to realize the significance of, the advantages associated with and/or the technical steps to be taken, in an arrangement wherein said AC-voltage regulating means and said NO-load switching unit is adapted to and/or sensible to a low frequency transmission, say down to 0 Hz, and a top high frequency transmission, say up to 1000 Hz.

The Solution

The present invention has its application within, is related to, and comprises of an arrangement, related to a subsea electric power distributing AC-system, and adapted for a deep subsea application, wherein said arrangement being enclosed in a watertight casing, whereby said casing is exposing a main power input connection, adapted for a watertight co-ordination with a first subsea cable, and a main power output connection, adapted for a watertight co-ordination with a second subsea cable, said second subsea cable being adapted for a power supply to an AC-adapted consumer, as a device or an equipment, such as a compressor or a pump equipment or the like.

In order to be able to solve one or more of the above-mentioned technical problems, the present invention in particular teaches that the technique known in this manner should be supplemented, in order to, among other things, enable the formation of said arrangement include interconnected at least: a voltage regulating means, connected to said first cable, a NO-load switching unit, connected to said second cable, and a control unit, whereby said control unit is to be adapted, in a disconnecting or breaking sequence, in a first operative mode, to regulate the output voltage from or via said voltage regulating means towards and to zero, or at least almost to zero, and in a second subsequent operative mode, bringing the NO-load switching unit from an ON-position to an OFF-position.

It is further suggested to complete the inventive idea with one or more of the following features, namely causing said control unit to be adapted, in a connecting sequence and at zero AC-voltage, in a third operative mode, to bring the NO-load switching unit from an OFF-position to an ON-position and in a subsequent fourth operative mode, to regulate the output voltage from or via said voltage regulating means from zero to a predetermined AC-voltage level.

Said voltage regulating means is to be controlled by said control unit within said casing and governed by a main control system.

Said control unit is further to be connected to a main control system by a third subsea cable, using a watertight connection, adapted for said subsea cable.

In a subsea network, exposing a number of parallel structured distributed branches, each of or a selected number of said branches is/are allotted a voltage regulating means and a NO-load switching unit for individually bringing each of said or predetermined branches to an OFF-mode or to an ON-mode or vice versa.

Said voltage regulating means is adapted to regulate and to reduce the output voltage or power towards zero by a magnetic flux adoption.

Said voltage regulating means is based upon a semi conductive technology, one or more positive temperature coefficient resistors, and/or mechanically or electrically controlled inductors.

Said NO-load switching unit is based upon a mechanical disconnection or breaking and/or a connection, being operable in a subsea environment and within an oil filled casing.

Said NO-load switching unit is based on a subsea wet mate power connector, hydraulically or electrically operable elements, which are adapted to operate by related elements, such as sliding elements.

Said NO-load switching unit is based upon an arrangement and/or a device for causing a physical separation of its contact means.

Said voltage regulating means and said NO-load switching unit is adapted to and/or sensible for a frequency transmission, say down to 0 Hz, and to a top high frequency transmission, say up to 1000 Hz.

Advantages

The advantages that foremost can be regarded as characteristic of the present invention and the special significant features provided thereby are that, in this way, conditions have been created or caused in order to, by an arrangement, related to a subsea electric power distributing AC-system and adapted for a deep subsea application, enclosed in a watertight casing, whereby said casing is exposing a main power input connection, adapted for a watertight co-ordination with a first subsea cable, and a main power output connection, adapted for a watertight co-ordination with a second subsea cable, said second subsea cable being adapted for a power supply to an AC-current and AC-voltage adapted consumer, such as a device or an equipment, such as a pump equipment or a compressor.

Exposing said arrangement the present invention especially includes interconnected at least: a voltage regulating means, connected to said first cable, and a NO-load switching unit, connected to said second cable and a control unit, enclosed in said casing.

Said control unit is adapted, in a disconnecting or breaking operative mode related to a power supply to a consumer, in a first operative mode, to regulate the output voltage from or via said voltage regulating means towards zero, and/or at least almost to zero, and in a second subsequent operative mode bringing the NO-load switching unit from an ON-position to an OFF-position, or a vice versa function, for connecting the power supply to the consumer.

BRIEF DESCRIPTION OF THE DRAWINGS

The present invention is to be described more in detail as an, at present suggested, embodiment with reference to the accompanying drawings, wherein.

DESCRIPTION OF NOW PROPOSED
EMBODIMENT EXPOSING THE
SIGNIFICATIVE FEATURES RELATED TO THE
PRESENT INVENTION

It should by way of introduction be emphasized that in the subsequent description of a presently proposed embodiment, which has the significant features associated with the invention and which is elucidated by the appended Figures, it has been chosen terms, expression and a particular terminology with the intention to thereby primarily allow to make clear the fundamental idea and/or ideas of the invention.

It should, however, in this connection be taken into consideration that expressions chosen here should not be seen as limiting solely to the terms utilized and chosen here, but it should be understood that each term chosen in this manner should be interpreted so that it, in addition, comprises all technical equivalents that operate in the same or substantially the same way, in order to, in this way, enable the achievement of the same or substantially the same intention and/or technical effect.

Figure 1:
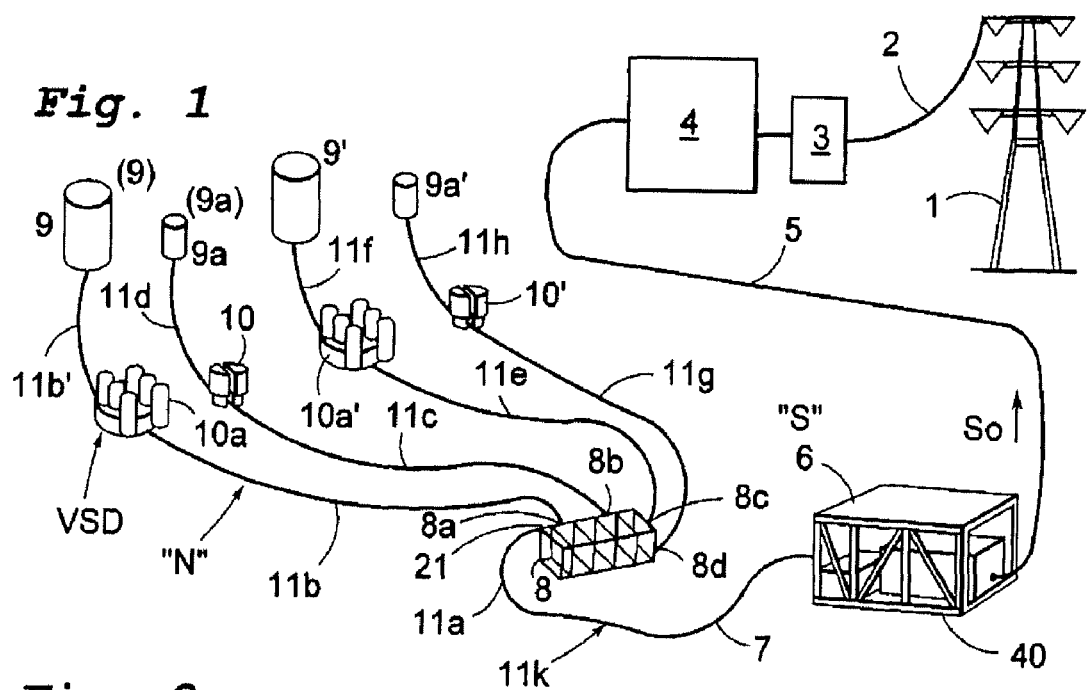
FIG. 1 is an over all view of a typical large electric power distributing system.

Thus, with reference to FIG. 1, there is schematically shown the fundamental conditions and requirements for the present invention and with the significative peculiarities or features associated with the invention generally having been made concrete, by a now proposed embodiment.

Thus FIG. 1 is an over all view of a typical large subsea electrical power distribution system, where a land related grid 1, via a cable network 2, is feeding a switching means 3.

Said switching means 3 is connected to a transformer 4, which via a subsea cable, an umbilical, 5, adapted for an AC-voltage and AC-current, is connected to a main transformer unit or means 6.

Included in said cable 5 or as a separate cable is used a control information carrying cable, intended to transmit information to and from control circuits 40, enclosed in and/or related to said unit 6.

Said main transformer unit or means 6 includes a main transformer connection chamber with bushing and penetrator, such as three one phase penetrators and termination assemblies.

It is here illustrated the use of a 145 kV dry mate cable termination or penetrator.

This main transformer means 6 is, via a schematically illustrated subsea cable 7, connected to a switchgear arrangement 8.

Such a subsea switchgear arrangement 8, comprising switches, is adapted to expose a complete and flexible module, arranged on a support structure, with connection points for umbilical/power cable and is adapted for control of electrical power supply and protection of other power equipment in case of abnormal conditions.

Said switches within said switchgear arrangement 8 can operate at full load and has "fail-safe open".

The embodiment in FIG. 1 illustrates that said switchgear arrangements 8 includes four switching means 8a-8d, each dimensioned for 24 kV/500 A and connected through a MECON 36 kV/500 A.

Said four switching means 8a, 8b, 8c and 8d are connected to different effect consuming apparatuses 9, 9a; 9', 9a', which here are activated, deactivated and/or driven by a "Subsea Variable Speed Drive" (denoted VSD-drive), having the reference numerals 10a, 10; 10a', 10'.

One switching means 8a, and similar for the remaining switching means 8b, 8c and 8d, is via a cable 11b connected to a VSD-drive 10a and further to the consumer 9, in the form of a compressor via a cable 11b'.

Said switching means 8b is via a cable 11c connected to a VSD-drive 10 and further to the consumer 9a, in the form of a pump, via a cable 11d.

Said switching means 8c is via a cable 11e connected to a VSD-drive 10a' and further to the consumer 9', in the form of a compressor, via a cable 11f.

Said switching means 8d is via a cable 11g connected to a VSD-drive 10' and further to the consumer 9a', in the form of a pump, via a cable 11h.

Any used switching means 8a-8d or coupling device being of one out of two embodiments, a first embodiment where AC-current and AC-voltages are switched ON and OFF at a zero voltage level and a second embodiment where AC-current and AC-voltages are switched ON and OFF at full power, with a present AC-voltage and AC-current, and thus causing a very high starting AC-current and an AC-voltage drop.

The first embodiment is designated, in the following description, as a NO-load switching unit and the second embodiment is here designated, in the following description, as a power ON-load switching unit or as a FULL-load switching unit and/or VSD-drive.

The present invention is merely related to a NO-load switching unit, and such a unit is adapted, after an ON position operative setting or mode, to raise the power output and the AC-voltage, through and by an AC-current and/or AC-voltage frequency control.

Such a NO-load switching unit is adapted, before its OFF position setting or mode, to reduce the power output, through and via an AC-current and/or AC-voltage frequency control, which will be described more in detail with reference to FIG. 4.

Figure 2:
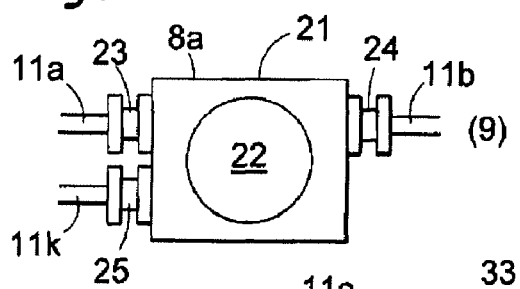
FIG. 2 is a side view of a coupling arrangement and/or device coordinated within a casing, adapted for a watertight covering of the arrangement and/or device exposing the circuits according to an embodiment of the present invention.

FIG. 2 is a side elevation view of a coupling device or an arrangement 22, enclosed in a watertight casing 21, said arrangement 22, including and enclosing the circuits of and the interrelation of the circuits, forming the functions of the arrangement 22 of the present invention.

Said casing 21 is also adapted to enclose one or more switching means 8a-8d.

An arrangement 22, related to a subsea electric power distributing AC-system "S", and adapted for a subsea application, being enclosed in said watertight casing 21, whereby said casing is exposing a main power input connection 23, adapted for a watertight co-ordination with a first subsea cable 11a, (7 in FIG. 1) and a main power output connection 24, adapted for a watertight co-ordination with a second subsea cable 11b.

Said second subsea cable 11b being adapted for a power supply to an AC-current and AC-voltage adapted device 9, such as a compressor unit (9) or a pump equipment (9a).

Said watertight casing 21 also exposes a power and/or information supplying and receiving subsea cable 11k and a cable connection 25.

This subsea cable 11k is adapted for an information exchange and is transferring signals between a control unit 32 and a control circuit 40. Said cable 11k may be enclosed in or build in the cable 7 or may be a separate cable.

Figure 3:
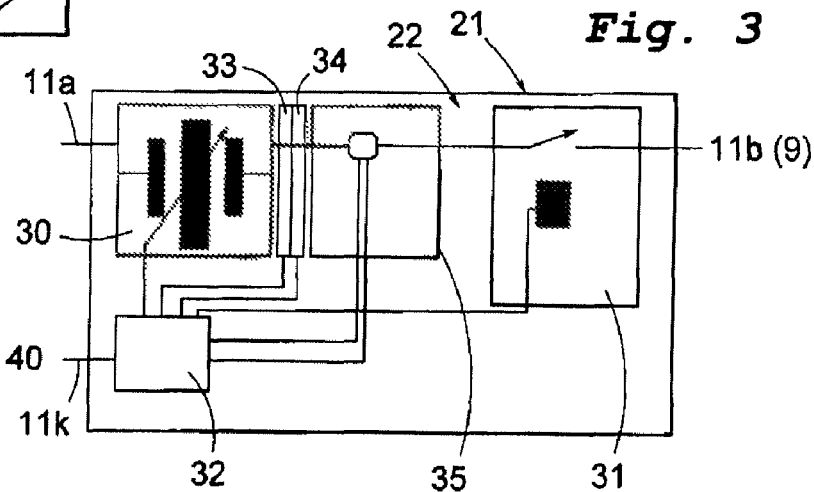
FIG. 3 is showing the circuit arrangements, according to an embodiment of the present invention, and an interconnection of a number of circuit means, illustrating said circuit means in block presentations, said circuit means are deactivated, activated and/or controlled by information carrying signals to and form a control unit or circuit.
Figure 3A:
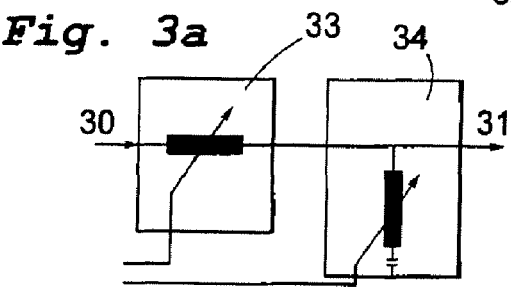
FIG. 3a is illustrating in more detail two intermediate arranged circuits in the form of blocks, shown in FIG. 3.

With a reference to FIG. 3 there is shown that said arrangement 22 includes interconnected at least: a voltage regulating means 30, connected to said first cable 11a, a NO-load switching unit 31, connected to said second cable 11b, and said control unit 32.

Said control unit 32 is adapted, for a disconnecting or breaking sequence, in a first operative mode, to regulate the output voltage from said voltage regulating means 30 towards and to zero, or at least almost to zero, and in a second subsequent operative mode, to bring the NO-load switching unit 31 from an ON-position to an OFF-position.

Said control unit 32 is adapted, for a connecting sequence, to reduce the AC-voltage towards zero and, in a third operative mode, to bring the NO-load switching unit 31 from an OFF-position to an ON-position and in a fourth subsequent position or operative mode to regulate the output voltage from said voltage regulating means 30 from zero to a predetermined AC-voltage level.

Said voltage regulating means 30 is controlled by said control unit 32 within said casing 21 and governed by a main control circuit or system 40, via said third cable 11k, using a watertight connection 25, adapted for said third subsea cable.

In a subsea network "N", exposing a number of parallel structured distributed branches 11b, 11c, 11e or 11g, each of or a selected number of said branches may be allotted a voltage regulating means 30 and a NO-load switching unit 31, for individually bringing each of said or predetermined branches to an OFF-mode and/or to an ON-mode.

Said voltage regulating means 30 is based upon a semi conductive technology, one or more positive temperature coefficient resistors, and/or one or more mechanically or electrical controlled inductors.

Said NO-load switching unit 31 is based upon a mechanical connection and/or disconnection, being operable within said watertight and oil filled casing 21, adapted for a subsea environment.

Said NO-load switching unit 31 may be based on a subsea wet mate power connector, hydraulically or electrically operable elements, which are adapted to operate with sliding elements.

Said NO-load switching unit 31 is based upon an arrangement causing a physically separate contact means.

Said voltage regulating means 30 and said NO-load switching unit 31 are adapted to and/or sensible to a low frequency transmission, say down to 0 Hz, and to a top high frequency transmission, say up to 1000 Hz.

Referring to the FIG. 3 illustration it is here arranged a voltage regulating means 30, in the form of a subsea transformer, with controllable transfer functions, such as using a variable magnetic flux control, for regulating the output AC-voltage to magnetic flux control units 33 and/or 34.

Said means 30 may firstly be connected to a first variable flux control 33, for an adapted variation of a series impedance, and secondly connected to a second variable flux control 34, for adapting the output AC-voltage to a selected phase/waveform, controlled and sensed in a unit 35.

It is to be noted that control and activating connections or connectors are arranged for said regulating means 30, said first flux control means 33, said second flux control means 34, said phase/waveform controlled unit 35, and finally said switching unit 31, by said control unit 32, for controlling the steps and processing steps that are to be performed.

It is further, in FIG. 3, indicated the interposition for AC-voltage and AC-current waveform control and/or sensor unit 35, which also is sensed and controlled by said control unit 32.

Figure 4:
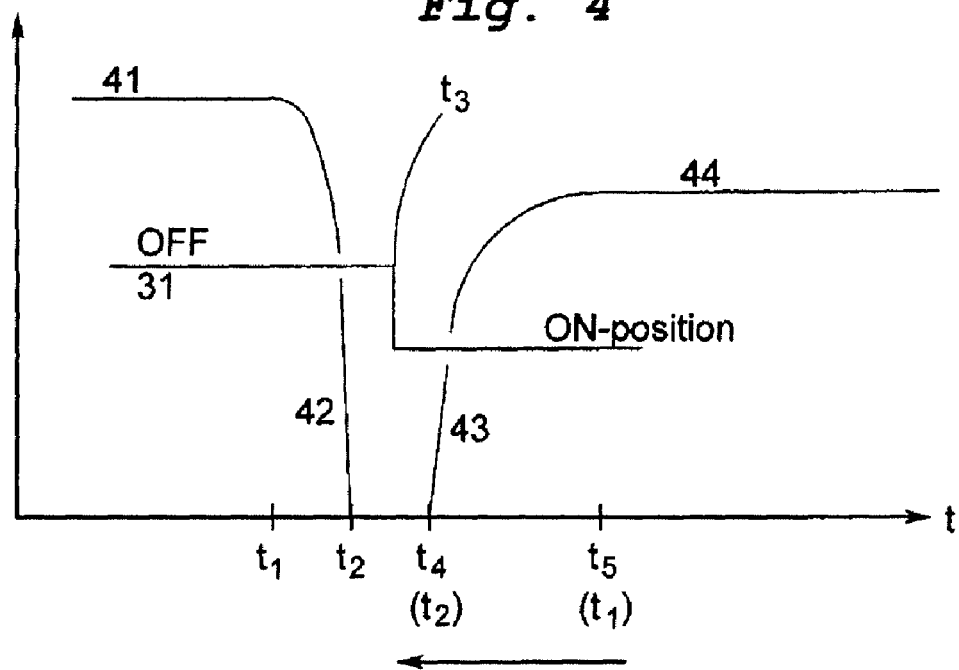
FIG. 4 illustrates the AC-voltage variations in a time sequence, where features related to a power connecting sequence is shown, activating the switching unit or means from an OFF to an ON position.

FIG. 4 is showing an AC-voltage to time diagram indicating a variable input AC-voltage 41 and its variation in time.

FIG. 4 is intended to illustrate, in an AC-voltage to time diagram or graph, a NO-load connecting sequence, where a regulated AC-voltage is, at a zero level connected to a consumer, such as a pump equipment.

This chosen sequence starts at a time moment where said control unit 32 receives, (at time sequence t1) an information carrying signal from said control circuit or equipment 40 that a selected consumer 9 is to be connected, via its switching unit 31, to the AC-voltage, however at an AC-voltage value at zero level.

This causes the control unit 32 to activate the AC-voltage regulating means 30, connected to said first cable 11a, to reduce from the AC-voltage value 41 its output AC-voltage towards and to a zero-value, as illustrated by the AC-voltage drop 42, reaching said zero value, at the time moment t2.

The control unit 32 has stored values to set the first and the second magnetic flux control units 33, 34, and said phase/waveform controlled unit 35 to fixed predetermined values representing the criteria of the actual consumers 9.

At a time moment t3 said switching unit 31 is activated, by a control signal from the control unit 32, to shift from an OFF position to an ON position, without any AC-voltage over the contacts of said switching unit 31.

At a time moment t4 said control unit 32 is activating the AC-voltage regulating means 30 to increase and to raise the output AC-voltage level 43 towards a predetermined AC-voltage value 44, at time moment t5, said AC-voltage value 44, corresponds to a value related to the selected consumer 9 considering any AC-drop expected between the switching unit 31 and the consumer 9.

It is to be noted that when a NO-load and NO-voltage disconnecting sequence is required the sequential steps of activating said units, such as the voltage regulating means 30 and the switching unit 31, for a NO-voltage and a NO-load connecting sequence, is to be activated in a reverse time sequence, where the starting time (t1) is to be added as a time moment t5, (t2) is to be added as a time moment t4 and so on.

It is further possible to arrange any VSD-drive outside the casing 21.

Figure 5:
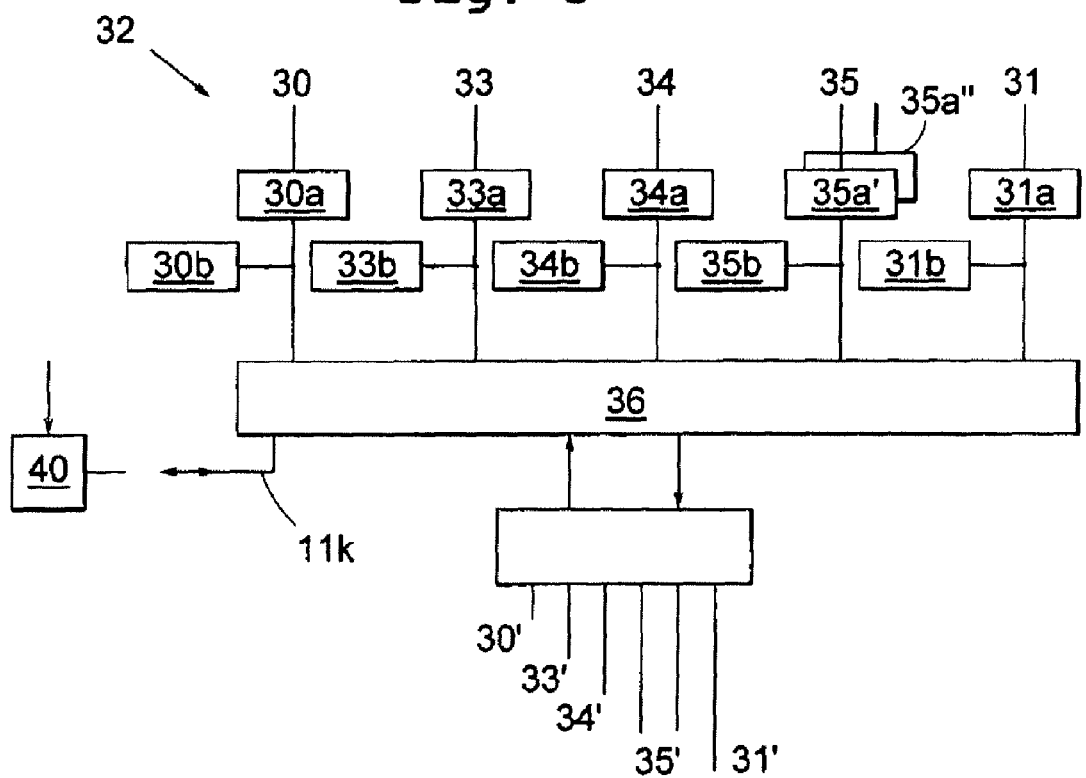
FIG. 5 is showing, in a block diagram, schematically a control unit and only some of its related circuit means.

FIG. 5 is showing, in a block diagram, a control unit 32 and its related means, circuits and functions.

It is here to be noted the use of input and/or output circuits or means.

One such means is adapted for the AC-voltage regulating means or unit 30, and has been allotted reference numeral 30a, one another such means is adapted for a first magnetic flux regulating means or unit 33, and has been allotted reference numeral 33a, one still another such means is adapted for a second magnetic flux regulating means or unit 34, and has been allotted reference numeral 34a, two still another such means are adapted for a means or unit 35, and have been allotted reference numerals 35a' resp. 35a" and still another such means are adapted for a switching unit 31, and has been allotted the reference numeral 31a.

FIG. 5 further indicates the use of memory means 30b, 33b, 34b, 35b and 31b, in which memory means are stored relevant criteria, related to each of the units mentioned above.

By these memory means it is possible to store previously received results and to adopt the settings of these units based upon already stored results and/or calculated new criteria.

Said control unit 32 is using a data equipment 36 for evaluating the values, which are to set the different units 30, 33, 34, 35 and 31 by output terminals 30', 33', 34', 35' and 31'.

The invention is of course not restricted to the above described and illustrated exemplifying embodiment thereof and that many modifications can be made within the scope of the inventive concept as defined in the accompanying claims.

Especially it is to be noted that here described means may be combined with one or more additional means, described or not described.

The invention claimed is:

1. An arrangement related to a fully powered subsea electric power distributing AC-system, and adapted for a subsea application, said arrangement comprising:
    a first subsea cable,
    a second subsea cable adapted for a power supply to an AC-current and AC-voltage adapted power consumer operating in a full power state,
    a watertight casing,
    a main power input connection exposed by said watertight casing and adapted for a watertight co-ordination with said first subsea cable,
    a main power output connection exposed by said watertight casing and adapted for a watertight co-ordination with said second subsea cable,
    an AC-voltage a voltage regulator arranged within the watertight casing and connected to said first cable, wherein said AC-voltage regulator configured, to reduce an output AC-voltage or power towards zero, utilizing a magnetic flux adoption,
    a No-load switching unit connected to said second cable, and
    a control unit arranged within the watertight casing, wherein the control unit is configured to control the voltage regulator and is adapted, for switching of the power consumer in the full power state in the fully powered subsea electric power distribution AC-system, in a disconnecting or breaking sequence, in a first operative mode, to regulate an output AC-voltage, from or via said voltage regulator towards zero and to zero, or at least almost to zero, and in a second subsequent operative mode to bring the NO-load switching unit from an ON-position and to an OFF-position, and wherein said control unit is adapted, in a connecting sequence during a NO-voltage condition, in a third operative mode, to bring the NO-load switching unit from an OFF-position to an ON-position, and in a subsequent fourth operative mode, to regulate the output AC-voltage from said voltage regulator from zero to a predetermined AC-voltage level.

2. The arrangement according to claim 1, wherein said AC-voltage regulator is governed by a main control circuit or equipment.

3. The arrangement according to claim 1, wherein said control unit is connected to a main control circuit by a third subsea cable, using a connection, adapted for said subsea cable.

4. The arrangement according to claim 1, wherein in a subsea network, exposing a number of parallel structured distributed branches, each of or a selected number of said branches is/are allotted an AC-voltage regulator and a NO-load switching unit for individually bringing each of said or predetermined branches to an OFF-position and/or to an ON-position or vice versa.

5. The arrangement according to claim 1, wherein said AC-voltage regulator is based upon a semi conductive technology, one or more positive temperature coefficient resistors, and/or one or more mechanically or electrically controlled inductors.

6. The arrangement according to claim 1, wherein said NO-load switching unit is based upon a mechanical connection and/or disconnection, being operable in a casing adapted for a subsea environment.

7. The arrangement according to claim 6, wherein said NO-load switching unit is based on a subsea wet mate power connector, mechanically, hydraulically or electrically operable by related elements.

8. The arrangement according to claim 7, wherein said NO-load switching unit is based upon an arrangement causing a physical separation of a contact of the NO-load switching unit.

9. The arrangement claim 8, wherein said voltage regulator and said NO-load switching unit are adapted to and/or sensible to a low frequency transmission and up to a top high frequency transmission.

10. The arrangement claim 9, wherein low frequency transmission is as low as 0 Hz and the high frequency transmission is up to 1000 Hz.

11. The arrangement according to claim 1, wherein said NO-load switching unit is based on a subsea wet mate power connector, mechanically, hydraulically or electrically operable by related elements.

12. The arrangement according to claim 1, wherein said NO-load switching unit is based upon an arrangement causing a physical separation of a contact of the NO-load switching unit.

13. The arrangement claim 1, wherein said voltage regulator and said NO-load switching unit are adapted to and/or sensible to a low frequency transmission and up to a top high frequency transmission.

14. The arrangement claim 13, wherein low frequency transmission is as low as 0 Hz and the high frequency transmission is up to 1000 Hz.

15. The arrangement according to claim 1, wherein the AC-current and AC-voltage adapted consumer comprise a compressor or pump equipment.

16. An arrangement related to a fully powered subsea electric power distributing AC-system, and adapted for a subsea application, said arrangement comprising:
a first subsea cable,
a second subsea cable adapted for a power supply to an AC-current and AC-voltage adapted power consumer operating in a full power state,
a watertight casing,
a main power input connection exposed by said watertight casing and adapted for a watertight co-ordination with said first subsea cable,
a main power output connection exposed by said watertight casing and adapted for a watertight co-ordination with said second subsea cable,
an AC-voltage regulator arranged within the watertight casing and connected to said first cable,
a NO-load switching unit connected to said second cable, and
a control unit arranged within the watertight casing, wherein the control unit is configured to control the voltage regulator and is adapted, for switching of the power consumer in the full power state in the fully powered subsea electric power distributing AC-system, in a disconnecting or breaking sequence, in a first operative mode, to regulate an output AC-voltage, from or via said voltage regulator towards zero and to zero, or at least almost to zero, and in a second subsequent operative mode to bring the NO-load switching unit from an ON-position and to an OFF-position, and wherein said control unit is adapted, in a connecting sequence during a N0-voltage condition, in a third operative mode, to bring the NO-load switching unit from an OFF-position to an ON-position, and in a subsequent fourth operative mode, to regulate the output AC-voltage from said voltage regulator from zero to a predetermined AC-voltage level.

* * * * *